United States Patent
Heo et al.

(10) Patent No.: US 10,184,717 B2
(45) Date of Patent: Jan. 22, 2019

(54) APPARATUS FOR DRYING ELECTRODE PLATE

(71) Applicant: Samsung SDI Co., Ltd., Yongin-si, Gyeonggi-do (KR)

(72) Inventors: Kyoungheon Heo, Yongin-si (KR); Jeesang Hwang, Yongin-si (KR); Suhwan Kim, Yongin-si (KR); Byoungkuk Kim, Yongin-si (KR); Sanggeun Yu, Yongin-si (KR); Hown Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/439,445

(22) Filed: Feb. 22, 2017

(65) Prior Publication Data

US 2017/0276429 A1    Sep. 28, 2017

(30) Foreign Application Priority Data

Mar. 22, 2016 (KR) .................. 10-2016-0034107

(51) Int. Cl.
  *F26B 3/04* (2006.01)
  *F26B 13/14* (2006.01)
  *F26B 23/00* (2006.01)
  *F26B 25/00* (2006.01)

(52) U.S. Cl.
  CPC ............. *F26B 3/04* (2013.01); *F26B 13/14* (2013.01); *F26B 23/002* (2013.01); *F26B 25/006* (2013.01)

(58) Field of Classification Search
  CPC ........... F26B 3/04; F26B 13/14; F26B 23/002; F26B 25/006
  USPC ........................................................... 34/62
  See application file for complete search history.

(56) References Cited

U.S. PATENT DOCUMENTS

| | | | | |
|---|---|---|---|---|
| 2,130,246 A | * | 9/1938 | Olcott ................. | F26B 15/24 34/207 |
| 2,220,004 A | * | 10/1940 | Smith ................. | H01M 4/21 134/18 |
| 2,231,457 A | * | 2/1941 | Stephen ............... | F26B 3/347 12/33.2 |
| 2,300,628 A | * | 11/1942 | Merson ............... | H01M 4/21 34/224 |

(Continued)

FOREIGN PATENT DOCUMENTS

| | | | | |
|---|---|---|---|---|
| GB | 1285413 A | * | 8/1972 | ............. H01M 10/10 |
| JP | 2867572 B2 | * | 3/1999 | ............. H01M 10/52 |

(Continued)

*Primary Examiner* — Stephen M Gravini
(74) *Attorney, Agent, or Firm* — Lewis Roca Rothgerber Christie LLP (57) ABSTRACT

An apparatus for drying an electrode plate includes a drying furnace configure to dry an electrode plate having a slurry coated thereon, an over-heated steam supplier configured to supply the drying furnace with over-heated steam as a drying heat source, a circulation fan configured to inhale at least some of the over-heated steam discharged from the drying furnace and to introduce the inhaled over-heated steam back into the drying furnace, an exhaust fan configured to inhale at least some of the gas exhausted from the drying furnace, and a heat exchanger configured to exchange heat of the exhaust gas supplied from the exhaust fan.

10 Claims, 4 Drawing Sheets

(56) References Cited

U.S. PATENT DOCUMENTS

| | | | | |
|---|---|---|---|---|
| 2,656,399 | A * | 10/1953 | Hindall | H01M 4/21 34/216 |
| 2,780,453 | A * | 2/1957 | Coffman | F27B 9/22 432/146 |
| 3,328,893 | A * | 7/1967 | Schilling | H01M 4/23 34/225 |
| 3,838,526 | A * | 10/1974 | McAlpine | F26B 3/305 34/418 |
| 3,943,002 | A * | 3/1976 | Scheuerle | F26B 3/04 34/443 |
| 5,098,481 | A * | 3/1992 | Monlux | B09C 1/06 134/19 |
| 5,223,088 | A * | 6/1993 | Hansen | B01D 1/18 159/2.1 |
| 5,248,387 | A * | 9/1993 | Hansen | B01D 1/18 106/486 |
| 5,775,004 | A * | 7/1998 | Steier | F26B 1/00 34/424 |
| 5,974,691 | A * | 11/1999 | Marchal | D21F 5/20 34/122 |
| 6,161,305 | A * | 12/2000 | Maier | C02F 11/12 34/221 |
| 7,401,417 | B2 * | 7/2008 | Rydell | F26B 21/004 34/451 |
| 7,513,061 | B2 * | 4/2009 | Hirayama | C02F 11/12 110/244 |
| 7,669,348 | B2 * | 3/2010 | Christy | F26B 11/16 110/246 |
| 8,056,252 | B2 * | 11/2011 | Fernandes | E04B 1/7069 126/299 D |
| 8,397,400 | B2 * | 3/2013 | Choo | B27K 1/00 110/244 |
| 9,869,514 | B2 * | 1/2018 | Haarlemmer | F26B 23/004 |
| 2014/0310979 | A1 * | 10/2014 | Bergset | F26B 11/16 34/487 |
| 2017/0276429 | A1 * | 9/2017 | Heo | F26B 3/04 |

FOREIGN PATENT DOCUMENTS

| | | |
|---|---|---|
| JP | 2006-294391 | 10/2006 |
| KR | 1996-0027012 | 7/1996 |
| KR | 10-1175032 | 8/2012 |
| KR | 10-1264522 | 5/2013 |
| KR | 10-1550487 | 9/2015 |

* cited by examiner

APPARATUS FOR DRYING ELECTRODE PLATE

CROSS-REFERENCE TO RELATED APPLICATION

This application claims priority to and the benefit of Korean Patent Application No. 10-2016-0034107, filed on Mar. 22, 2016 in the Korean Intellectual Property Office, the content of which is incorporated by reference herein in its entirety.

BACKGROUND

1. Field

Embodiments of the present invention relate to an apparatus for drying an electrode plate.

2. Description of the Related Art

A secondary battery is designed to be repeatedly charged and discharged, unlike a primary battery that is not designed to be recharged. Secondary batteries are manufactured in various types and may be classified as cylindrical secondary batteries, prismatic secondary batteries or pouch secondary batteries. The pouch secondary battery is manufactured by installing an electrode assembly, formed by interposing a separator acting as an insulator between a positive electrode plate and a negative electrode plate, and an electrolyte solution in a pouch case and sealing the resultant structure.

The process of forming the electrode assembly includes coating a slurry on a metal current collector and drying the coated slurry to form an active material layer. In general, the drying of the slurry is performed by supplying a heat transfer medium to the slurry to evaporate a solvent from the slurry.

SUMMARY

Embodiments of the present invention provide an apparatus for drying an electrode plate which uses over-heated steam as a heat source (e.g., as a heat transfer medium) for drying the electrode plate.

The above and other features and aspects of the present invention will be described in or will be apparent from the following description of exemplary embodiments thereof.

According to an embodiment of the present invention, an apparatus for drying an electrode plate includes a drying furnace configured to dry an electrode plate having a slurry coated thereon, an over-heated steam supplier configured to supply the drying furnace with over-heated steam as a drying heat source, a circulation fan configured to inhale at least some of the over-heated steam discharged from the drying furnace and to introduce the inhaled over-heated steam back into the drying furnace, an exhaust fan configured to inhale some of the gas exhausted from the drying furnace, and a heat exchanger configured to exchange heat of the exhaust gas supplied from the exhaust fan.

The apparatus may further include a heater configured to heat the over-heated steam supplied from the over-heated steam supplier and the circulation fan.

The apparatus may further include a temperature sensor in the drying furnace, and the temperature sensor may be configured to measure a temperature of the over-heated steam in the drying furnace.

The heater may be configured to be controlled according to the temperature measured by the temperature sensor.

The heater may be configured to heat the over-heated steam to about 130° C. or higher.

The heat exchanger may include a cooling water line through which cooling water is configured to pass.

The exhaust gas introduced to the heat exchanger may include the over-heated steam, solvent gas from which a solvent of the slurry is evaporated, and air.

The heat exchanger may be configured to liquefy the over-heated steam and the solvent gas to be exhausted to outside of the heat exchanger.

The over-heated steam may be introduced into the heat exchanger to have a proportion of about 38.5% or higher relative to a mixed gas of the over-heated steam and an evaporated gas from the slurry.

The inside of the drying furnace may be in an inert gas atmosphere.

As described above, embodiments of an electrode plate drying apparatus according to the present invention use over-heated steam as a drying heat source, thereby increasing safety and energy efficiency of a drying process of an electrode plate.

BRIEF DESCRIPTION OF THE DRAWINGS

The above and other features and aspects of the present invention will become more apparent by describing, in detail, exemplary embodiments thereof with reference to the attached drawings, in which.

DETAILED DESCRIPTION

Hereinafter, exemplary embodiments of the present invention will be described, in detail, with reference to the accompanying drawings such that they can easily be made and used by those skilled in the art.

The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention will be defined by the appended claims and their equivalents.

In the drawings, thicknesses of layers and regions may be exaggerated for clarity. Like numbers refer to like elements throughout. As used herein, the term "and/or" includes any and all combinations of one or more of the associated listed items.

In addition, the terminology used herein is for the purpose of describing particular embodiments only and is not intended to be limiting thereof. As used herein, the singular forms "a" and "an" are intended to include the plural forms as well, unless the context clearly indicates otherwise. It will be further understood that the terms "includes," "including," "comprises" and/or "comprising," when used in this specification, specify the presence of stated features, integers, steps, operations, elements and/or components but do not preclude the presence or addition of one or more other features, integers, steps, operations, elements, components and/or groups thereof.

It will be understood that, although the terms first, second, etc. may be used herein to describe various members, elements, regions, layers and/or sections, these members, elements, regions, layers and/or sections should not be limited by these terms. These terms are used to distinguish one member, element, region, layer and/or section from another. Thus, for example, a first member, a first element, a first region, a first layer and/or a first section discussed below could be termed a second member, a second element, a second region, a second layer and/or a second section without departing from the teachings.

It will be understood that when an element or layer is referred to as being "on," "connected to" or "coupled to" another element or layer, it may be directly on, connected or coupled to the other element or layer or one or more intervening elements or layers may also be present. When an element is referred to as being "directly on," "directly connected to" or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using" and "used" may be considered synonymous with the terms "utilize," "utilizing" and "utilized," respectively.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The controller and/or any other relevant devices or components according to embodiments of the present invention described herein may be implemented utilizing any suitable hardware, firmware (e.g., an application-specific integrated circuit), software, and/or a suitable combination of software, firmware, and hardware. For example, the various components of the controller may be formed on one integrated circuit (IC) chip or on separate IC chips. Further, the various components of the controller may be implemented on a flexible printed circuit film, a tape carrier package (TCP), a printed circuit board (PCB), or formed on a same substrate as the controller. Further, the various components of the controller may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present invention.

Hereinafter, an electrode plate drying apparatus according to an embodiment of the present invention will be described.

Figure 1:
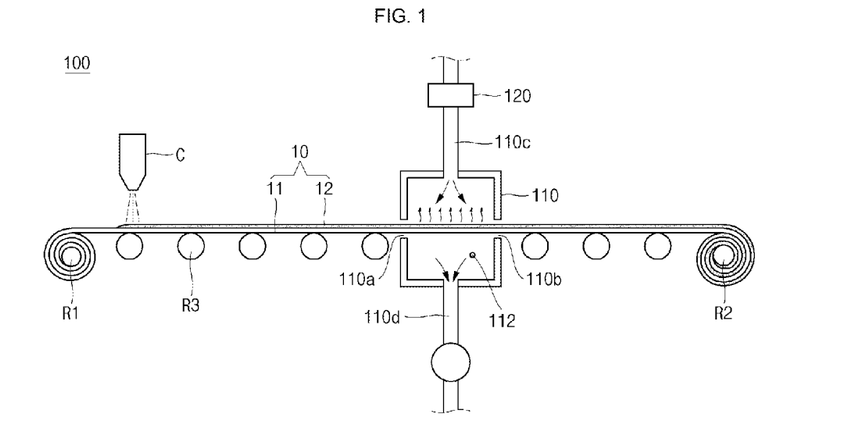
FIG. 1 is a schematic diagram of an electrode plate drying apparatus according to an embodiment of the present invention.
Figure 2:
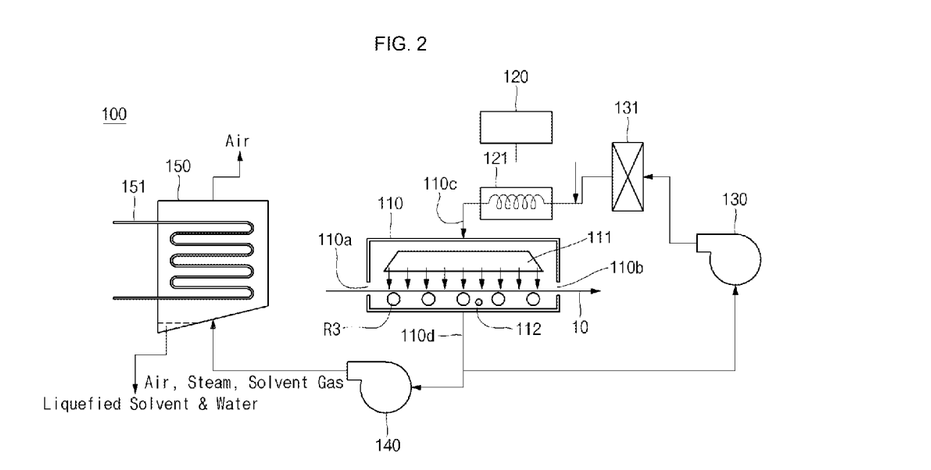
FIG. 2 is a block diagram of an electrode plate drying apparatus according to an embodiment of the present invention.
Figure 3:
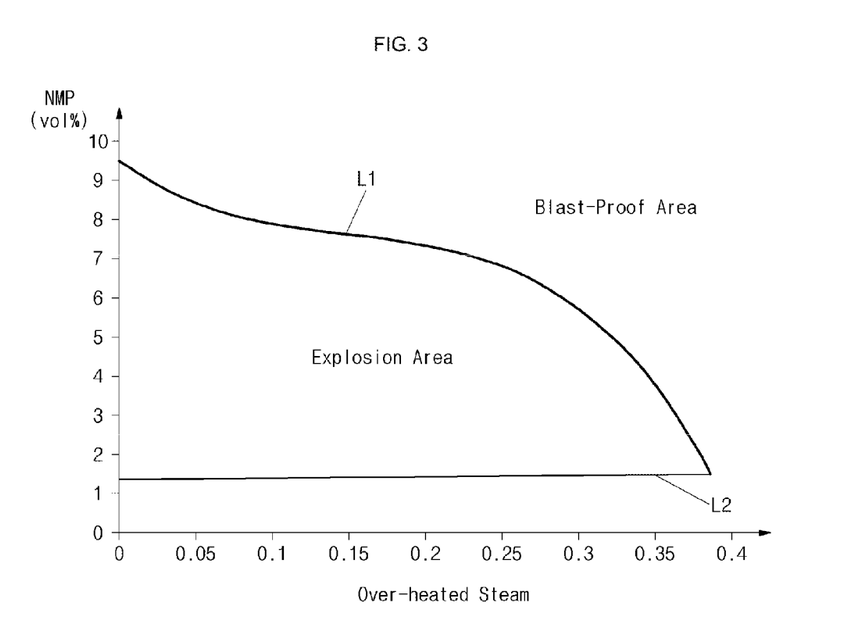
FIG. 3 is a graph illustrating an explosion area of NMP gas depending on the proportion of over-heated steam.
Figure 4:
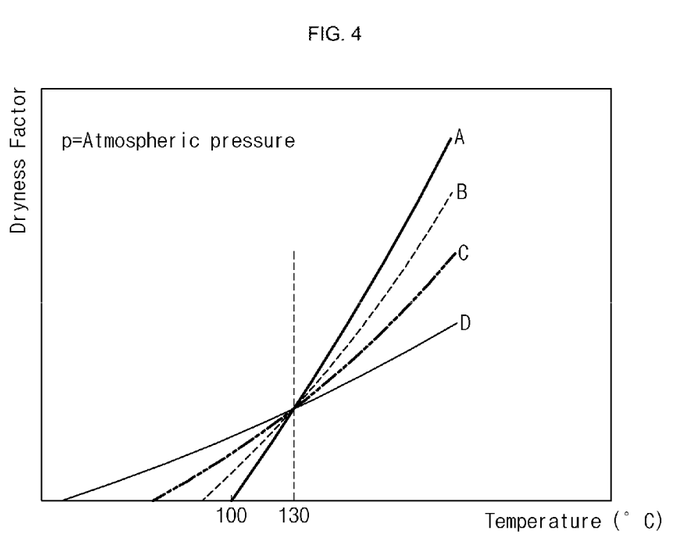
FIG. 4 is a graph illustrating dryness factors depending on temperatures of over-heated steam and hot air.

FIG. 1 is a schematic diagram of an electrode plate drying apparatus according to an embodiment of the present invention, FIG. 2 is a block diagram of an electrode plate drying apparatus according to an embodiment of the present invention, FIG. 3 is a graph illustrating an explosion area of NMP gas depending on the proportion of over-heated steam, and FIG. 4 is a graph illustrating dryness factors depending on temperatures of over-heated steam and hot air.

First, referring to FIG. 1, the electrode plate drying apparatus 100 according to an embodiment of the present invention includes a plurality of rollers R1, R2 and R3 and a coater C.

The rollers R1, R2 and R3 include a supply roller R1, a winding roller R2 and a transfer roller R3. The supply roller R1 unwinds an electrode plate 10 and supplies the unwound electrode plate 10 to the electrode plate drying apparatus 100. The winding roller R2 winds the electrode plate 10 having passed (e.g., having passed through) the electrode plate drying apparatus 100. The transfer roller R3 includes a plurality of transfer rollers R3 between the supply roller R1 and the winding roller R2 and transfers the electrode plate 10 therebetween.

The coater C coats a slurry 12 on the electrode plate 10 that is unwound from the supply roller R1. The electrode plate 10 includes a current collector 11 formed of a metal thin film, and the slurry 12 is coated on the current collector 11 by the coater C. The coater C includes (e.g., is constructed in the form of) a slit nozzle to discharge (or spray) the slurry 12. In one embodiment, the slurry 12 is coated on the current collector 11 as the current collector 11 moves through or along the transfer rollers R3.

The slurry 12 coated on the current collector 11 includes a solvent and an active material dissolved in the solvent. The slurry 12 is coated on the current collector 11 (e.g., a positive electrode plate or a negative electrode plate) and is dried to evaporate the solvent. Accordingly, the active material of the slurry 12 adheres to the current collector 11 in a solid phase (e.g., only the active material of the slurry 12 adheres to the current collector 11 as the solvent of the slurry 12 is evaporated therefrom), thereby forming an electrode plate of a second battery. In one embodiment, an organic solvent, such as N-methyl-2-pyrrolidone (NMP), can be used as the slurry of the positive electrode plate. In addition, an aqueous solvent, for example, can be used as the slurry of the negative electrode plate. However, aspects of the present invention are not limited thereto.

Hereinafter, a configuration of the electrode plate drying apparatus 100 will be described, in detail, with reference to FIG. 2.

The electrode plate drying apparatus 100 includes a drying furnace 110, an over-heated steam supplier 120 (e.g., an over-heated steam supply unit), a heater 121 (e.g., a heating unit), a circulation fan 130, an exhaust fan 140 and a heat exchanger 150.

The drying furnace 110 includes an entrance 110a through which the electrode plate 10 is introduced thereto and an exit 110b through which the electrode plate 10 exits therefrom. The electrode plate 10 is subjected to the drying process while passing through the inside of the drying furnace 110, thereby evaporating the solvent from the slurry 12. In addition, the drying furnace 110 may further include a supply pipe 110c through which the over-heated steam for drying the electrode plate 10 is supplied and a discharge pipe 110d through which the over-heated steam used for drying the electrode plate 10 and a solvent gas are discharged. When the over-heated steam is supplied through the supply pipe 110c, some of the air in the atmosphere may be supplied together with the over-heated steam. In addition, when the over-heated steam and the solvent gas are discharged from the discharge pipe 110d, the air may be discharged together with the over-heated steam and the solvent gas. A valve is provided in each of the supply pipe 110c and the discharge pipe 110d and is configured to be opened or closed, thereby controlling the influx and outflux of the over-heated steam.

Although only one drying furnace 110 is illustrated in the figures, a plurality of drying furnaces may be arranged in series. The electrode plate 10 is supplied to the drying furnace 110 in a roll-to-roll manner to be subjected to the drying process.

The drying furnace 110 further includes a drying nozzle 111 and a temperature sensor 112. The drying nozzle 111 accelerates the over-heated steam introduced into the drying furnace 110 and sprays the accelerated over-heated steam toward or onto a surface of the slurry 12. The temperature sensor 112 measures the temperature of the inside of the drying furnace 110. The heater 121 is controlled (or driven) based on the measured temperature to heat the over-heated steam introduced to the drying furnace 110 (e.g., to heat the over-heated steam to a certain temperature).

The over-heated steam supplier 120 supplies the over-heated steam into the drying furnace 110. The over-heated steam may be introduced into the drying furnace 110 through the supply pipe 110c. In one embodiment, the over-heated steam may pass through the heater 121 to be heated and may then be introduced into the drying furnace 110. The over-heated steam supplier 120 may include a device for heating water and for generating over-heated steam. Any device that is capable of generating over-heated steam, for example, a boiler, can be used as the device.

The over-heated steam refers to vapor (steam) generated by the evaporation of water ($H_2O$) which has heat (additional heat) applied thereto. For example, water is evaporated at about 100° C. in an atmospheric state to turn into a gas, which is referred to as vapor (steam). When heat is applied to the vapor (steam) in the atmospheric state without restricting the pressure, the vapor (steam) becomes over-heated steam.

The heater 121 may be provided between the over-heated steam supplier 120 and the drying furnace 110. The heater 121 heats the over-heated steam supplied from the over-heated steam supplier 120. In addition, the over-heated steam discharged from the drying furnace 110 and circulated by or through the circulation fan 130 may also be heated by the heater 121. The heater 121 may operate according to the temperature of the over-heated steam measured by the temperature sensor 112 in the drying furnace 110. Any device that is capable of heating the air, for example, an electrical heater or a gas heater, can be used as the heater 121.

The circulation fan 130 inhales the over-heated steam discharged from the drying furnace 110 after drying the electrode plate 10 and introduces the inhaled steam back into the drying furnace 110. For example, some of the over-heated steam discharged from the discharge pipe 110d is re-circulated by the circulation fan 130. Accordingly, the energy required to generate and heat the over-heated steam is reduced, thereby increasing the energy efficiency of the overall drying system. When the over-heated steam is circulated by the circulation fan 130, some solvent gas and air may also be circulated together with the over-heated steam.

A HEPA (High Efficiency Particulate Air) filter 131 is installed at a rear end (e.g., an output) of the circulation fan 130 to purify the over-heated steam by removing impurities.

The exhaust fan 140 allows some of the gas (the exhaust gas) discharged from the discharge pipe 110d to be introduced into the heat exchanger 150. The exhaust gas discharged from the discharge pipe 110d may contain the over-heated steam, the solvent gas and the air.

The heat exchanger 150, including a cooling water line 151, exchanges heat between the exhaust gas introduced by the exhaust fan 140 and the cooling water. The exhaust gas is liquefied in the heat exchanger 150. In one embodiment, almost all of the over-heated steam and the solvent gas, except for the air from among the elements contained in the exhaust gas, are liquefied in the heat exchanger 150. The exhaust gas, having a relatively large volume according to the temperature and pressure in a gaseous phase, may be recovered in a liquid phase after its volume is rapidly reduced by the heat exchanger 150. Therefore, the over-heated steam and the solvent gas contained in the exhaust gas may be recovered as water and a liquefied solvent. In addition, the air contained in the exhaust gas is cooled to then be exhausted to the outside.

The operation of the electrode plate drying apparatus 100 will now be described in further detail.

The over-heated steam supplier 120 generates over-heated steam and supplies the same to the drying furnace 110. The over-heated steam is heated by the heater 121 at relatively high temperatures and is then injected into the drying furnace 110. In one embodiment, the temperature of the over-heated steam heated by the heater 121 may be about 130° C. or higher.

The over-heated steam is introduced into the drying furnace 110 and is accelerated through the drying nozzle 111 to be sprayed toward the electrode plate 10. The slurry 12 containing the active material and the solvent is coated on the electrode plate 10, and the solvent in the slurry 12 is evaporated by the over-heated steam. The air in the atmosphere and the evaporated solvent gas may exist in the drying furnace 110 together with the over-heated steam. The air is contained in the drying furnace 110 in a negligible amount compared to the over-heated steam. The air and the solvent gas may be discharged through the discharge pipe 110d together with the over-heated steam. The air and the solvent gas may also be present with the over-heated steam that is re-circulated by the circulation fan 130.

The solvent gas may contain volatile gas having an explosion probability (e.g., may be a flammable or combustible gas). For example, NMP may be used as the solvent for the slurry of a positive electrode plate, and NMP gas is volatile. Therefore, drying furnace 110 should be maintained in an atmosphere so as to prevent an explosion. In embodiments of the present invention, the over-heated steam of inert gas supplied to the drying furnace 110 is used as a drying heat source, thereby reducing a risk of or preventing an explosion from occurring in the drying furnace 110.

As illustrated in FIG. 3, when the volatile solvent gas (e.g., NMP gas) is mixed with the air, it has an upper explosion limit L1 and a lower explosion limit L2. However, according to Le Châtelier's principle, the range between the upper explosion limit L1 and the lower explosion limit L2 is reduced by mixing an inert gas with a volatile gas. When the amount of the inert gas mixed with the volatile gas exceeds a certain level, the volatile gas becomes inert (e.g., turns into a completely inert gas).

For example, when the proportion of the over-heated steam is zero (0), the lower explosion limit L2 of the NMP gas is about 1.3 vol % and the upper explosion limit L1 is about 9.5 vol %. That is, a combustion range (explosion area) of the NMP gas is in a range of about 1.3 vol % to about 9.5 vol %. When the NMP gas has a value outside of this range (explosion-proof area or blast-proof area), explosion or combustion does not occur. As the proportion of the over-heated steam increases, the upper explosion limit L1 gradually decreases while the lower explosion limit L2 gradually increases. For example, the range between the lower explosion limit and the upper explosion limit is gradually reduced. When the proportion of the over-heated steam is about 0.385, the upper explosion limit and the lower explosion limit meet each other. That is, when the over-heated steam is injected at a rate exceeding 0.385 (38.5%), the mixed gas (NMP gas+over-heated steam) becomes inert (e.g., becomes a perfectly inert gas). The proportion of the over-heated steam indicates a proportion of the over-heated steam existing in the mixed gas of the NMP gas and the over-heated steam. In addition, for the sake of convenient explanation, the portion of the over-heated steam at which the mixed gas becomes inert is defined as an inert reference value. Referring to FIG. 3, for example, based on the volume proportion of the gas in an atmospheric state, the inert reference value of the mixed gas (NMP gas+over-heated steam) is 0.385.

In embodiments of the present invention, the over-heated steam may be injected into the drying furnace 110 in an amount of about two to three times the inert reference value. For example, based on the amount of NMP to be evaporated per time, the over-heated steam is injected into the drying furnace 110 in an amount of about two to three times the inert reference value. For example, in the graph shown in FIG. 3, because the over-heated steam becomes inert when it has a proportion of 0.385 relative to the amount of the mixed gas (sum of the NMP gas and the over-heated steam), the over-heated steam is injected into the drying furnace 110 in the amount of two to three times of that of the inert reference value. Therefore, the gas atmosphere of the drying furnace 110 is in an inert state (becomes inert) in which there is little to no risk of explosion, thereby allowing for stable performance of a drying process at a relatively high temperature.

While embodiments of the present invention have been described in which NMP is used as the solvent, embodiments of the present invention are not limited thereto.

The over-heated steam, resulting from a phase change from a liquid state to a gas state by water absorbing heat energy, may have more energy than the air. For example, the over-heated steam having passed through the heater 121 has a greater amount of energy than the hot air generated by simply heating the air. In addition, because water ($H_2O$) in a gas state has a lower molecular weight than the air ($N_2O_2$), it has a lower density at the same temperature and pressure. Therefore, it is possible to quickly elevate the temperature of the over-heated steam to then quickly dry the slurry.

Referring to FIG. 4, temperature-dependent dryness factors of the over-heated steam (A), the mixed gas (B, C) of the hot air and the over-heated steam and the hot air (D) are illustrated. As can be seen, B has a greater proportion of over-heated steam than C. For example, the proportion of over-heated steam gradually increases in the order of D, C, B and A (D<C<B<A), while the proportion of hot air gradually decreases in that order (D>C>B>A). In addition, the temperature-dependent dryness factor is measured under the atmospheric pressure condition. As illustrated in FIG. 4, when the temperature reaches a certain level, for example, about 130° C. or higher, the over-heated steam has a greater dryness factor than the hot air. Therefore, in embodiments of the present invention, the over-heated steam is maintained (e.g., preferably maintained) at a temperature of about 130° C. or higher.

Therefore, the over-heated steam having relatively high energy, low density and a high dryness factor is capable of drying the slurry of an electrode plate relatively quickly.

After the drying process is performed in the drying furnace 110, the exhaust gas discharged to the discharge pipe 110d is induced or introduced into the circulation fan 130 or the exhaust fan 140. The amount of the exhaust gas induced into the circulation fan 130 or the exhaust fan 140 may be controlled by a controller. The exhaust gas may contain the over-heated steam, the solvent gas and the air (or the hot air).

In an electrode plate drying apparatus according to embodiments of the present invention, over-heated steam is used as the drying heat source so that the inside of the drying furnace 110 is maintained in an inert atmosphere. Therefore, the high-temperature exhaust gas discharged from the drying furnace 110 can be recycled (or fully recycled) by the circulation fan 130 to then be introduced back into the drying furnace 110.

For example, when the hot air is used as the drying heat source, the hot air injected to maintain the concentration of the solvent gas contained in the drying furnace 110 at a safe level is immediately discharged to the outside together with the solvent gas. However, in embodiments of the present invention, because the inside of the drying furnace 110 is in an inert atmosphere, the solvent gas does not need to be immediately discharged after the drying process. Therefore, the over-heated steam used in the drying process can be circulated by the circulation fan 130 to then be introduced back into the drying furnace 110. In some cases, not only the over-heated steam but also some of the solvent gas and the air are circulated by the circulation fan 130. However, because the inside of the drying furnace 110 is in the inert gas atmosphere, some of the solvent gas can be re-circulated without safety concerns.

The temperature sensor 112 installed in the drying furnace 110 can measure the temperature of the over-heated steam contained in the drying furnace 110. The temperature measured by the temperature sensor 112 is transmitted to the controller, and the controller controls the operation of the heater 121 according to the temperature measured by the temperature sensor 112. For example, the recycled over-heated steam is heated (reheated) to a temperature (e.g., to a certain or predetermined temperature) as desired, thereby reducing the energy requirements. According to embodiments of the present invention, the heater 121 may be controlled such that the temperature of the over-heated steam is maintained at about 130° C. or higher.

Therefore, according to embodiments of the present invention, the high-temperature over-heated steam discharged from the drying furnace 110 is recycled, thereby reducing the energy required for generating and heating the over-heated steam. In addition, in order to prevent the over-heated steam from being liquefied (or to reduce the amount of over-heated steam that is liquefied), the inside of the drying furnace 110 is maintained at a temperature of about 100° C., preferably about 130° C. or higher. In embodiments of the present invention, the high-temperature over-heated steam is recycled, thereby reducing the energy required to maintain the temperature of the over-heated steam.

The exhaust fan 140 introduces some of the exhaust gas into the heat exchanger 150. The exhaust gas has a relatively large volume according to the temperature and pressure in a gaseous phase. The exhaust gas exchanges heat with cooling water passing through the cooling water line 151 of the heat exchanger 150 to be cooled such that the volume of the exhaust gas is rapidly reduced. When the exhaust gas is cooled to about 100° C. or less, the over-heated steam and the solvent gas turn into water and a liquefied solvent (e.g., enter a liquid state), and the volume of the exhaust gas is rapidly reduced. The over-heated steam and the solvent gas are liquefied by the heat exchanger 150 and are then recovered such that the amount of the exhaust gas may be reduced or minimized. Because water and the liquefied solvent have different boiling points, they can be recycled. In addition, the air contained in the exhaust gas is cooled and exhausted to the outside. However, the exhausted air may be exhausted along with small amounts of the over-heated steam and the solvent gas.

Table 1 shows the drying time required to dry an electrode plate using a drying apparatus using hot air and over-heated steam as drying heat sources, respectively.

TABLE 1

|  | Drying Time (min) |
|---|---|
| Hot air drying furnace (30 m) | 1 |
| Over-heated steam drying furnace (25 m) | 0.625 |

Referring to Table 1, the drying furnace using the over-heated steam has a shorter length (25 m) than the hot air drying furnace (30 m) but has a lower drying time (0.625 min) than the hot air drying furnace (1 min). For example, the drying time of the drying furnace using the over-heated steam is improved by about twice that of the hot air drying furnace, confirming that the drying speed is improved when an electrode plate is dried using over-heated steam.

Table 2 provides a comparison of power usage of electrode plate drying apparatuses using over-heated steam and hot air as drying heat sources. In Table 2, the term "standby power" means power consumed in a standby mode. For example, according to embodiments of the present invention, because the over-heated steam injected into the drying furnace is circulated and recycled, the energy necessary during operation is not always constant. Therefore, a reduced or minimum amount of energy is used in the standby mode. In Table 2, Electrode Plate 1 may be, for example, a negative electrode plate and Electrode Plate 2 may be, for example, a positive electrode plate.

TABLE 2

|  | Electrode plate drying apparatus (Hot air) | Electrode plate drying apparatus (Over-heated steam) | |
|---|---|---|---|
|  | Standby/ Operating power (kW) | Standby power (kW) | Operating power (kW) |
| Electrode Plate 1 | 1,744 | 270 | 680 |
| Electrode Plate 2 | 780 | 130 | 180 |

As can be seen in Table 2, when over-heated steam was used instead of hot air, the power consumption of the drying apparatus was reduced. For example, it was confirmed that the electrode plate drying apparatus using over-heated steam consumed reduced power by at least one third (⅓) compared to the electrode plate drying apparatus using hot air. Accordingly, the electrode plate drying apparatus according to embodiments of the present invention provides improved energy efficiency by employing over-heated steam as a drying heat source.

As described above, an electrode plate drying apparatus according to embodiments of the present invention uses the over-heated steam having relatively high energy and low density as a drying heat source. Therefore, at the time of drying the electrode plate slurry, rapid temperature elevation and drying can be achieved. In addition, even if volatile gas is present in the evaporated solvent gas, inert over-heated steam may be used as the drying heat source to perform a stable drying process. Further, because the over-heated steam used in the drying process can be recycled, the overall energy efficiency of the drying process can be improved. In addition, the over-heated steam in the exhaust gas and the solvent gas may be cooled by a heat exchanger to be recovered as water and a liquefied solvent, thereby reducing the volume and the amount of exhaust gas.

Figure 5:
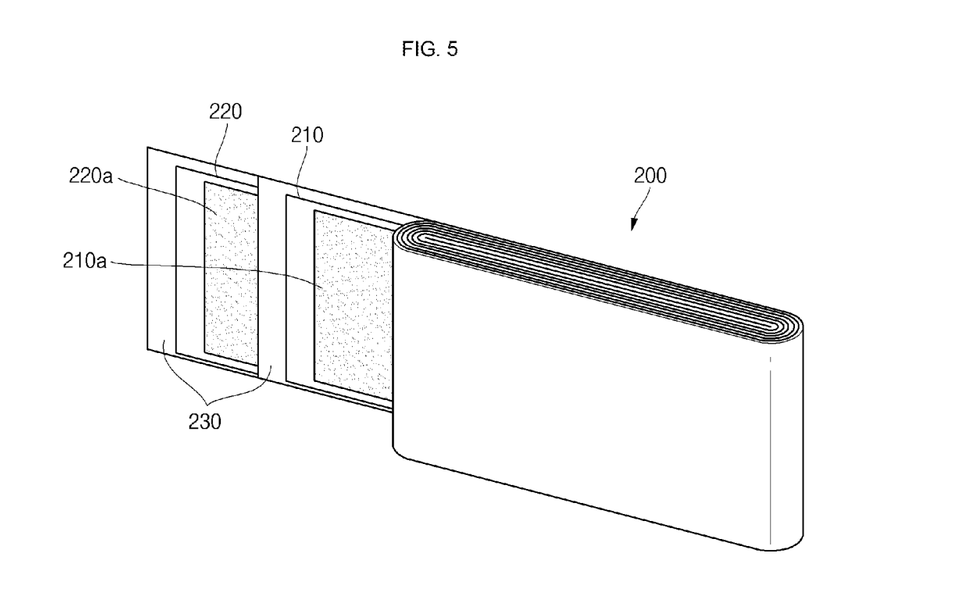
FIG. 5 is a perspective view of a partially unwound electrode assembly including an electrode plate manufactured by using an electrode plate drying apparatus according to an embodiment of the present invention.

FIG. 5 is a perspective view of a partially unwound electrode assembly including an electrode plate manufactured by an electrode plate drying apparatus according to an embodiment of the present invention.

Referring to FIG. 5, the electrode assembly 200 includes a first electrode plate 210, a second electrode plate 220 and a separator 230.

The electrode assembly 200 is formed by winding or laminating a stacked structure including the first electrode plate 210, the separator 230 and the second electrode plate 220, which are formed of thin plates or layers. The first electrode plate 210 may serve as a positive electrode, the second electrode plate 220 may serve as a negative electrode and vice versa.

The first electrode plate 210 is formed by applying a first electrode active material, such as a lithium containing transition metal oxide, on a first electrode collector formed of metal foil, such as aluminum foil or lithium chalcogenide compound. The first electrode active material may be prepared by coating a first electrode active material slurry on at least one surface of the first electrode current collector, followed by drying by using, for example, the electrode plate drying apparatus illustrated in FIGS. 1 and 2. However, the material of the first electrode plate 210 is not limited to those listed in the present invention.

The second electrode plate 220 is formed by applying a second electrode active material, such as graphite or carbon, on a second electrode current collector formed of metal foil, such as copper, copper foil, nickel or nickel foil. The second electrode active material may be prepared by coating a second electrode active material slurry on at least one surface of the second electrode current collector, followed by drying by using, for example, the electrode plate drying apparatus illustrated in FIGS. 1 and 2. However, the material of the second electrode plate 220 is not limited to those listed in the present invention.

The separator 230 is located between the first electrode plate 210 and the second electrode plate 220 to prevent a short circuit therebetween and allows the movement of lithium ions. The separator 230 may be formed of polyethylene, polypropylene or a combined film of polyethylene and polypropylene. However, the material of the separator 230 is not limited to those listed.

The electrode assembly 200 is accommodated in a case together with an electrolyte. In addition, electrical paths may be formed in the first and second electrode plates 210 and 220, which are respectively connected to first and second electrode tabs drawn to outside of the case.

While an apparatus for drying an electrode plate has been particularly shown and described with reference to exemplary embodiments of the present invention, it will be understood by those of ordinary skill in the art that various changes in form and details may be made therein without departing from the spirit and scope of the present invention as defined by the following claims and their equivalents.

What is claimed is:

1. An apparatus for drying an electrode plate, the apparatus comprising:
    a drying furnace configured to dry an electrode plate having a slurry coated thereon;
    an over-heated steam supplier configured to supply the drying furnace with over-heated steam as a drying heat source;
    a circulation fan configured to inhale at least some of the over-heated steam discharged from the drying furnace and to introduce the inhaled over-heated steam back into the drying furnace;
    an exhaust fan configured to inhale some of the gas exhausted from the drying furnace; and
    a heat exchanger configured to exchange heat of the exhaust gas supplied from the exhaust fan,
    wherein the drying furnace has an entrance at one side of the drying furnace and an exit at an opposite side of the drying furnace as the entrance, the entrance and the exit exposing an inside of the drying furnace and being configured to allow the electrode plate to continuously pass through the inside of the drying furnace.

2. The apparatus of claim 1, further comprising a heater configured to heat the over-heated steam supplied from the over-heated steam supplier and the circulation fan.

3. The apparatus of claim 2, further comprising a temperature sensor in the drying furnace, the temperature sensor being configured to measure a temperature of the over-heated steam in the drying furnace.

4. The apparatus of claim 3, wherein the heater is configured to be controlled according to the temperature measured by the temperature sensor.

5. The apparatus of claim 2, wherein the heater is configured to heat the over-heated steam to about 130° C. or higher.

6. The apparatus of claim 1, wherein the heat exchanger comprises a cooling water line through which cooling water is configured to pass.

7. The apparatus of claim 1, wherein the exhaust gas introduced to the heat exchanger comprises the over-heated steam, solvent gas from which a solvent of the slurry is evaporated, and air.

8. The apparatus of claim 7, wherein the heat exchanger is configured to liquefy the over-heated steam and the solvent gas to be exhausted to outside of the heat exchanger.

9. The apparatus of claim 1, wherein the over-heated steam is introduced into the drying furnace to have a proportion of about 38.5% or higher relative to a mixed gas of the over-heated steam and an evaporated gas from the slurry.

10. The apparatus of claim 1, wherein the inside of the drying furnace is in an inert gas atmosphere.

* * * * *